Patented Jan. 22, 1952

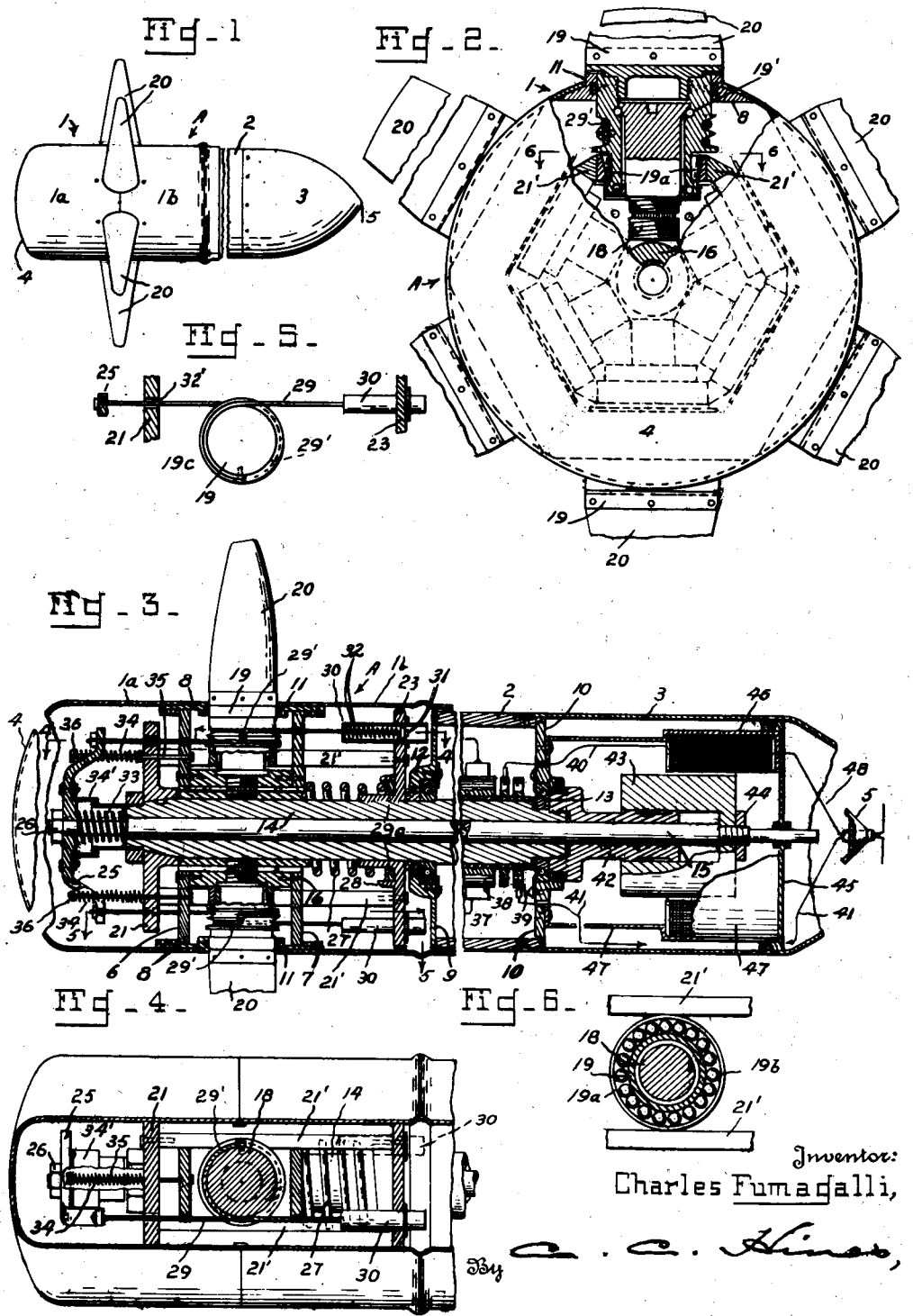

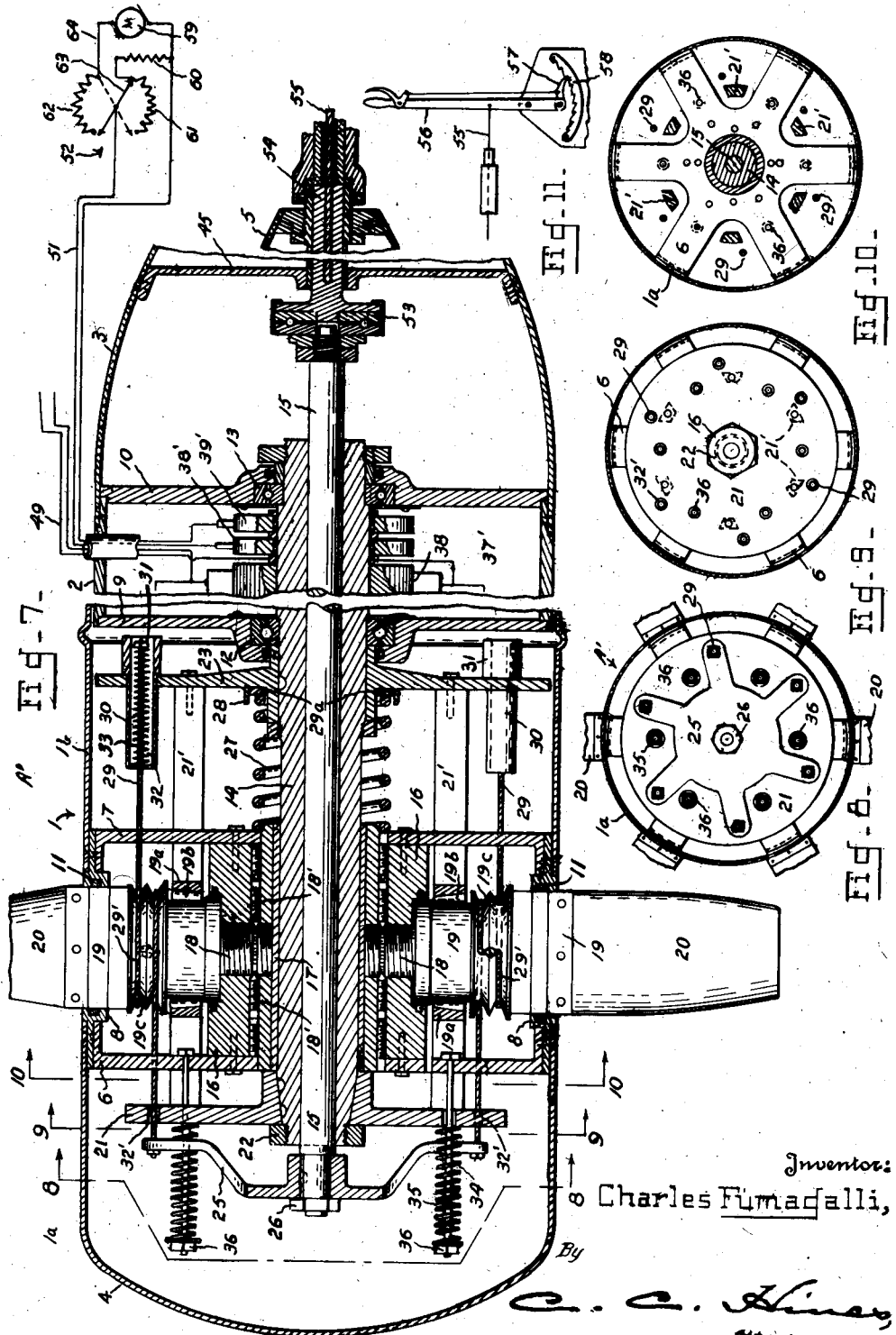

2,583,369

UNITED STATES PATENT OFFICE 2,583,369

WIND-DRIVEN TURBINE OR PROPELLER WITH ELECTRIC GENERATOR AND CONTROL DEVICES

Charles Fumagalli, Guatemala City, Guatemala

Application May 21, 1948, Serial No. 28,488

17 Claims. (Cl. 290—44)

This invention relates to an air driven turbine or propeller for driving electric generators, alternators, dynamos or other service apparatus or machines, and particularly to an air turbine for driving the service generator employed on high speed vehicles, such as commercial and military airships or airplanes, jet or rocket planes, robot planes, or guided missiles or other like self-propelled or launched vehicles, either manually piloted or remote-controlled, where an electric generator is used on the vehicle to supply current for operating radio apparatus, the servo-motors of steering control systems, or for firing explosive charges, or for various other purposes.

One object of the invention is to provide an air-driven self-governed turbine or propeller which will adjust itself automatically and instantaneously to the speed of the wind to regulate its own speed and drive the generator at a predetermined substantially constant rate regardless of the speed of the wind or speed of travel of the vehicle or any changes in the generator torque due to variations in the load in the circuit supplied by the generator.

Another object of the invention is to provide an air-driven turbine which is comparatively simple and inexpensive in construction and of compact type and which embodies blades adjustable by wind pressures and counteracting mechanical and electrical control means for regulating the speed and power of the turbine to drive it at a safe speed and to drive the generator at a substantially constant speed or generating rate regardless of any variations in the load conditions in the service circuit supplied by the generator.

With these and other objects in view, which will appear in the course of the subjoined description, the invention consists of the novel features of construction, combination and arrangement of parts, hereinafter more fully described and claimed, and shown in the accompanying drawings, in which:

Figure 1 is a view in side elevation, and on a reduced scale, and with parts broken away, of an air turbine embodying my invention.

Fig. 2 is a front end elevation of the turbine with portions broken away and in section to show certain features of construction.

Fig. 3 is a vertical longitudinal section of the same, with parts broken away, and showing the blades and control elements in normal position.

Fig. 4 is a sectional plan view on line 4—4 of Figure 3.

Fig. 5 is a fragmentary detail sectional view taken on line 5—5 of Figure 3.

Fig. 6 is a detail section taken on line 6—6 of Figure 2.

Fig. 7 is a vertical longitudinal section similar to Figure 3, but on a larger scale, showing a modified form of the invention.

Figs. 8, 9 and 10 are cross-sections taken, respectively, on lines 8—8, 9—9 and 10—10 of Figure 5.

Fig. 11 is a view of a control lever for manually adjusting the control rod.

Referring now more particularly to Figs. 1 to 6, inclusive, of the drawings, A represents a turbine having a streamline casing which may be of any suitable construction, but which as shown comprises a front portion in the form of a head section 1, and a rear portion in the form of an intermediate section 2 and a rear or tail section 3, said sections being mounted in such manner as to permit of their ready assemblage with their contained parts and of their disassemblage for repairs, replacements or other purposes when required. The section 1 terminates at its forward end in a closed nose portion 4 forming an air pressure surface, while the section 3 terminates at its rear end in a reduced tip 5, preferably of conical form.

Arranged within the casing section 1, in front and rear of its transverse center, are supporting and spacing heads, disks or frame members 6 and 7 which bear at their peripheries against outer dust and moisture excluding packing and bridge members 8, said disks and bridge members being suitably secured to the casing shell. Arranged within and fixed at their peripheries to the front and rear edges of the section 2 are bearing and supporting heads or disks 9 and 10, which are thus arranged at the points of juncture of the three sections 1, 2, and 3. At its rear end the section 1 laps over upon the front end of the section 2 but is free from connection therewith, and at its front end the section 3 laps over upon the rear end of the section 2, and these lapping ends of the sections 2 and 3 are fastened together in any preferred manner. The packing and bridge members 8 are provided with portions 11 which project outward through openings in the section 1. In practice this section 1, which forms the housing for the propeller proper and the speed controlling mechanism, is preferably formed of two parts 1a and 1b joined at their meeting edges to and by the bridge members and the fastenings securing the same thereto. In these edges of the parts 1a and 1b are formed mating cutaway portions or recesses defining openings through which the portions 11 of the members 8 project.

Extending through the heads 6, 7, 9, 10, and journaled in antifriction bearings 12 and 13 in the heads 9, 10, is a rotatable, non-slidable shaft 14 with which the casing portion or section 1 rotates. Through this shaft extends a controlling rod 15 which is rotatable with the shaft and longitudinally slidable therein, but which is normally held against sliding movement and is slidably moved only under certain conditions to govern the action of the propeller, as hereinafter described.

The turbine or propeller construction per se includes, in addition to the shaft 14, a hub sleeve 16 which is slidably fitted with a bushing or liner 17 on said shaft and is fixed to the heads 6, 7. This hub is provided with an annular series of radial bores or sockets in which are threaded stationary stub shafts or spindles 18, secured to the hub against rotation by set screws 18'. On these stub shafts or spindles are rotatably mounted blade carrying staffs or brackets 19 which project outwardly through the portions 11 of the members 8 and to which are secured the propeller blades 20. Antifriction bearings 19' are provided between the spindles and brackets to adapt the latter to turn with a minimum degree of friction. Any suitable number of blades 20 may be employed and so mounted on the sliding hub, six blades being shown in the present instance which are equidistantly spaced about the shaft or axis of rotation of the propeller.

The hub 16 is fixed by the heads 6 and 7 and bridge members 8 to the casing section 1 to slide on the shaft 14 as a unit therewith, these parts carrying with them in their sliding movements the blades 20, which are axially adjustable in such sliding movements to vary their pitch and the speed of rotation of the propeller. To this end means are provided whereby the blades are adapted to be adjusted under wind pressures and the action of speed controlling means to vary their pitch and the speed of rotation of the turbine or propeller. The speed controlling means employed adapts the blades to be shifted with the hub rearwardly on the shaft under varying wind pressures acting on the blades and the nose of the casing section 1, in which action the blades are axially adjusted to increase their pitch or angle of incidence proportionate to the speed of the wind to maintain a constant speed of the propeller, this sliding movement of the parts being in opposition to a counteracting force resisting their rearward sliding movement and energized thereby to slide said parts forwardly on the shaft, as the wind forces decrease, toward their original position, during which the blades are adjusted to reduce their pitch or angle of incidence to maintain the same speed of the propeller, the speed controlling or governing operation being such that a predetermined substantially constant speed of the propeller will be maintained regardless of the speed of the wind. On the brackets 19 are fitted wheels or rollers 19a, between which and the brackets are ball bearings 19b, which rollers in the sliding movements of the parts travel on track rails hereinafter described.

It will be understood from the foregoing that the rear portions of the casing formed by the sections 2 and 3 are mounted on the vehicle so as to be fixed against rotary and longitudinal movements on or relative to the shaft 14, while the front portion of the casing formed by the section 1 rotates with the shaft and is also slidably movable thereon with the hub and blades from a normal forward position, at which the blades are disposed in starting position, to a maximum rearward position, at which the blades are disposed at their greatest angle of incidence, and that the casing section 1 is movable with the hub and blades forwardly from the maximum rearward position to normal position to reduce the pitch or angle of incidence of the blades, so that at varying speeds of the wind or of the vehicle the sliding parts will move back and forth and change the pitch angles proportionately to wind or vehicle speed variations to keep the propeller rotating at the predetermined substantially constant speed regardless of the other speed factors named. The blades 20 are of suitable airfoil shape and proper dimensions to adapt them for the purpose when used on high speed vehicles of the character referred to, and suitable for the size or type and intended or rated speed of the vehicle.

The speed controlling means comprises a motion transmitting and translating mechanism which includes a disk or head 21 keyed to the forward end of the shaft 14 and abutting against a nut 22 applied to the shaft, a disk or head 23 fixed to the shaft 14 within the rear portion of the casing section 1, bars 21' connecting the heads or disks 21 and 23 and forming track rails on which the propeller bracket rollers 19a travel, and a disk or head 25 keyed to the forward end of the rod 15 and abutting against a nut 26 on the rod, the head 25 being preferably in the form of a peripherally armed member or spider, the arms of which are equal in number to the propeller blades employed. A coiled spring 27, arranged about the shaft 14 and inner end of the hub 16, between the hub and a cupped or channeled flange 28 fixed to the head 23, is provided to resist the rearward sliding movement of the section 1 and hub, and the compression of this spring and its resistance to compression may be regulated and varied by the use of shims or spacing washers 29a disposed in the cup of the flange 28, and bearing on the rear end of the spring. Each blade carrying bracket has a grooved cylindrical portion 19c to which is intermediately fastened against slippage the coiled portion 29' of a flexible cable 29. One end of this cable extends rearwardly into a spring housing 30 secured to the head 23 and is provided with an abutment head 31 between which and the forward closed end of the housing is disposed a coiled spring 32, while the opposite end of the cable extends forwardly through a guide opening 32' in the head 21 and is fastened to one of the arms of the spider 25. The cables 29 couple the staffs of the blades to the heads 23 and 25 in this manner to provide a bow-drill type of motion transmitting and translating mechanism whereby when the casing section 1 and hub 16 are slidably moved rearwardly to a greater or less degree on the shaft 14 the blades will be turned axially from a normal position to increase their angles of incidence or pitch more or less according to the speed of the wind, thus to a greater or less degree compressing the spring 27, while, when the casing section 1 and hub 16 are slidably moved forwardly by the pressure of the spring 27, the blades will be turned to decrease their angles of incidence or pitch proportionately and relatively to the decreases in wind speed. The strength of the spring 27 is so proportioned with respect to its resistance to the sliding movements of the propeller under wind pressures that it will normally maintain the propeller in its forward position for starting under no load and under a given wind pressure, balanced by the spring, until the wind force is sufficient to more or less overcome the resistance of the spring to establish a speed governing action, under wind pressures and the counteracting force of the spring, to maintain the speed of the propeller at a substantially constant rate regardless of the speed of the wind or vehicle.

A coiled spring 33, disposed about the forward end of the rod 15 in a telescopic casing 34' between the nut 26 and spider 25, serves to hold the rod in its normal forward position and to resist rearward sliding movement thereof and to yieldingly maintain the spider in its normal position, while permitting rearward movement of the rod for adjustment of the blades under the action of an electrical controller to increase the power of the turbine under certain conditions, as hereinafter described. The telescopic casing shown is formed of inner and outer sections having stop flanges to limit the movement of the outer section, so that in the fully extended condition of the telescopic casing the degree of expansion of the spring 33 is limited and said spring held slightly compressed. The spring 33 is of a strength somewhat greater than the combined strength of the springs 32 and exerts through the spider sufficient pull on the cables to hold the springs 32 slightly compressed. Through the opposing pressures of these springs the ends of the cables will be kept taut to keep the blades normally accurately set in starting position. If desired, other springs 34 may be provided for cooperation with the spring 27 to resist rearward sliding movement of the casing section 1 and hub 16. These springs are mounted on rods 35 fixed at their rear ends to the head 6 and provided at their forward ends with nuts 36, between which and the head 21 the springs 34 are arranged. These springs 34 may be of such strength in proportion to that of the spring 27 that through their conjoint action the desired counteracting force will be obtained to yieldingly resist rearward sliding movement of the propeller under wind pressure. In some cases, also, the spring 27 may be dispensed with and the springs 34 used in lieu thereof to supply the counterforce, or spring 27 may be used without the springs 34 for this purpose.

The casing section 2 forms a housing for a generator, which as shown is a self-excited alternator 37, which is driven by the propeller to supply current to the vehicle for any of the purposes previously described. As this propeller is especially designed for used on high speed vehicles, as set forth, to operate at a safe speed under all conditions and to drive the shaft 14 and element driven thereby at a substantially constant speed, electrical means, forming a constituent part of the propeller, are provided for cooperation with the mechanical controlling means to govern the propeller not only in accordance with wind speed, but also in accordance with variations in the generator torque dependent on the load conditions in the electric circuit supplied by the generator and which operates the service devices on the vehicle. As shown, a portion of the shaft 14 forms the drive shaft or armature shaft of the generator, on which are mounted a commutator 38 and collector rings 39 and from which output conductors 40 and 41 extend through head 10 into the casing section 3 which forms a housing for the electrical control means secured to the rear end of the shaft 14. Rotating at its forward end in a bearing on the head 10 is a guiding and bearing sleeve 42 of non-magnetic anti-friction material which is secured to shaft 14 to rotate therewith and in which a part of the rear end of the rod 15 is fitted to slide. The rear portion of this sleeve extends into a recess or socket in a solenoid core 43 which rotates with and is slidable forward and backward on the sleeve. The rod 15 has a reduced rear extremity, a part of which is in threaded engagement with the core and secured thereto by a nut 44 and a part of which extends through and is in guided engagement with a supporting head or disk 45 fixed to the casing section 3. The core is slidably movable from the normal position shown in Fig. 3 rearwardly in the solenoid coil 46 under its attractive force when it is energized to shift the rod 15 rearwardly for a control action. The coil is supported in an enclosing tube 47 connected to the heads 10 and 45, into which, through the head 10, extend the conductors 40 and 41, one of which is connected in series with the coil. From the coil leads a supply conductor 48 which projects outward through the tip 5 for supplying the current from the generator to the circuit on the vehicles containing the appliance or appliances which are to be serviced, from which circuit a return conductor 41 leads back to the generator.

It will be understood from the foregoing description that the spring 33, acting in opposition to the springs 32, will hold the blades in an angular position at which the turbine is operated at its full speed, and at which it develops just enough power to drive the ilding alternator at a fixed constant speed and constant generating frequency. Any load in the circuit, however, will draw current from the alternator, which will flow through the solenoid coil and energize it, thus pulling the core 43, rod 15 and spider 25 rearwardly so that the cables will be drawn upon by the springs 32 to adjust the propeller blades to a pitch angle sufficient to increase the driving power of the turbine at such fixed constant speed and frequency to drive the alternator at a power sufficient to take care of the current demand of the electric circuit.

From the foregoing description, taken in connection with the drawings, the construction and mode of operation of the propeller and mechanical speed controller or governor will be readily understood. It will be apparent that the expansive force of the reaction spring 27, and that of any cooperating springs is such, relative to the area of the pressure surface 4 and that of the blades on which the wind forces act to slide the propeller rearwardly, that no rearward sliding movement of the propeller occurs until a wind force of a certain high degree of intensity prevails, due to direct head wind pressure or pressure created by the travel of the vehicle, when the propeller begins to rotate at its predetermined substantially constant speed, from which time under wind pressures and counteracting spring forces the spring actuated controlling means begins to function. Initially the parts are adjusted so that in their normal position the blades will be set at a proper starting and idling angle from and toward which in their axial adjustments they will be moved by the speed controlling means to vary their pitch under relatively high and lower wind forces to govern the propeller action to drive the shaft 14 and generator at the predetermined substantially constant speed. At the start and until there is a current demand by the electric circuit supplied by the generator, and as the generator is running in a substantially no load condition, the pitch angle of the blades is so adjusted automatically as to drive the generator at a low rate and sufficient power to compensate the torque incident to the impedance of the electric circuit. This speed rate will be kept substantially constant by the aero-mechanical speed controller at all wind speeds until there are current demands from the electric service circuit on the vehicle. In the normal position of the parts, and when the electric circuit is broken against the flow thereto of current from the generator, the solenoid core occupies the position shown in Fig. 3, in which it is held by action of the spring 33. When, however, the electric circuit is switched on to receive flow of current from the generator, the solenoid coil is energized to draw the armature rearwardly to a certain degree whereby the spider 25 is pulled rearwardly to further compress the spring 33 and relax the ends of the cables 29 connected therewith, and whereby the other ends of the cables will be relaxed and drawn backwardly by the springs 32 to shift the blades to a lower pitch speed angle, variable according to demands, to increase the power of the turbine, as a result of which the turbine will be operated to supply power according to the circuit demands while the speed of the turbine will be kept constant at all wind pressures by the mechanical controller as modified by the controlling action of the electric controller. When the service circuit is switched out of connection with the generator the parts will be automatically returned to normal position and controlled in action by the mechanical controller.

Figures 7 to 11, inclusive, of the drawings show a turbine A' which is the same in construction as that shown in Figures 1 to 6, inclusive, with the exception of the omission of the spring 33 and its casing, certain changes in the means for operating the rod 15, and certain changes in the electric circuit supply and control connections, the parts shown in Figures 7 to 11 which are similar to those shown in Figures 1 to 6, inclusive, being designated by similar reference characters. The turbine A' is more particularly designed to be used on pilot operated vehicles in which provision is made for supplying direct and alternating current to instrumentalities to be driven and automatically maintaining at all times a full load on the generator notwithstanding load variations in the supply circuit, as well as to adapt the control rod 15 to be manually operated. The generator 37' here shown is of the self-excited full load alternator type from the field of which lead the direct current wires 49 to supply direct current for general purposes, and from the collector rings 38', 39' of which extend the wires 51 for supplying alternating current. The wires 51 lead to a variable commutator rheostat 52 for supplying the current to a motor or motors, radio instruments or other appliances and which operates to keep the circuit load constant so that the alternator may operate under full load conditions. The rod 15 in this construction is connected at its rear end by a coupling 53 to a non-rotatable shaft 54 slidably mounted in a bearing sleeve supported by the head 45 and tip 5 and extending outwardly through the latter. To the shaft 54 is connected one end of a control cord or cable 55 leading to and connected to a lever 56 mounted on the vehicle whereby the rod may be drawn rearwardly to adjust the blades in the manner previously described and to such an extent if desired as to throw the turbine out of action. The lever carries a pawl 57 to engage a rack 58 whereby it may be held in adjusted position or released to allow springs 32 to return the rod to normal position.

It will be understood that a commutator rheostat 52 is used in connection with each motor or other electrical device employed in the service circuit, that herein shown, for purpose of example, being employed in connection with a motor 59 which may be used for any service purpose.

The commutator rheostat shown comprises a resistance 60, a pair of resistances 61 and 62, and a switch member 63. The centrally pivoted swinging switch member 63 is connected to one of the wires 51 and its ends are arranged to travel along the resistances 61 and 62 to variably cut in one and cut out the other as its ends move in opposite directions over said resistances. In practice, this switch member may be manually operated or it may be operated by any suitable type of remote control means. As shown, the resistance 60 is connected at one end to the other wire 51 and at its other end to the starting or cut in end of the resistance 61 and is in parallel with the motor but is adapted to be connected in series with the generator output circuit and the resistances 61 and 62 by the switch. Resistance 62, which is a counterpart of resistance 61, is connected at its cut out end to the other pole of the motor by the conductor 64. Switch 63, when in its normal or cut out position shown in the drawings, is disengaged from the resistances 61 and 62, and connects the wires 61 through the resistance 60 to form a closed generator output circuit in which current may flow when the motor is thrown out of action. In starting the motor 59 the switch member 63 is moved clockwise along the resistances 61 and 62, whereby resistance 61 is connected in series with resistance 60 to establish a maximum resistance to the flow of current which resistance is gradually increased for a motor starting action. Simultaneously the switch moves along the resistance 62 and gradually reduces its resistance as the motor speed builds up under an increase in the flow of current thereto. The movement of the switch is continued up to the point at which the switch moves out of engagement with the resistance 61 and at which conductor 64 is engaged by the switch so that there will be a full flow of current to the motor to operate it at full capacity. A reverse movement of the switch gradually disconnects the motor from the generator circuit and connects the wire 51 and resistance to form the closed generator output circuit when the motor is disconnected, whereby the generator will continue to operate at full load.

It will thus be understood that through the action of the commutator switch the flow of current generated by the generator working at full load may be supplied or not to the service circuit, and that when not supplied it will flow in a closed circuit including the generator, so that the generator will always operate at full load (torque), and so that the turbine will always be compelled to operate at its full power capacity. The speed and power governing action of the turbine will thus be simplified to obtain a predetermined constant RPM, the speed governor having only to take care of the RPM by varying the action of the propeller through adjustment of the blades to angles of greater or less efficiency at different wind velocities.

The manual lever control means is provided for the purpose of varying the speed and power of the turbine when used to drive a non-electrical appliance, and to drive one or more of them in a manner requiring power changes, without liability of the turbine overrunning, and the said lever may be used to stop the motion of the turbine by feathering the blades to an ineffective angle. The turbine action may thus be varied by the use of the control devices disclosed to adapt it to be used for guiding radio-guided missiles, etc., piloted airplanes, etc., and to drive either electrical or non-electrical appliances used on vehicles of the types named.

While the constructions shown herein for purposes of exemplification are preferred, it will, of course, be understood that changes in the form, construction and arrangement of parts, such as fall within the scope of the appended claims, may be made without departing from the spirit or sacrificing any of the advantages of the invention.

I claim:

1. A wind driven turbine including in combination a rotatable non-sliding shaft, a hub rotatable with and slidable longitudinally of the shaft, blades carried by the hub and axially adjustable to vary their pitch or angle of incidence, the hub and blades being coupled to the shaft and rotatable by the action of the wind to drive the shaft, a casing enclosing said parts and including at least a portion rotatable with the hub and slidable therewith in one direction and to a greater or less degree in accordance with the strength of the wind, means for establishing a counteracting force against the sliding movement of the hub under a wind force of a certain intensity and operating to slide the hub in the opposite direction against the resistance of a relatively reduced wind force, motion transmitting and translating means operable by the sliding movements of the hub to change the pitch or angle of incidence of the blades proportionately to the strength of the wind to cause the shaft to be driven at a substantially constant speed at any wind speed, a power supply device driven by the shaft, and a means governed in action by power demand on said device for shifting the blades to vary their driving power.

2. A wind driven turbine including in combination a rotatable non-sliding shaft, a hub rotatable with and slidable longitudinally of the shaft, blades carried by the hub and axially adjustable to vary their pitch or angle of incidence, the hub and blades being rotatable by the action of the wind and coupled to the shaft to drive said shaft, said hub and blades being slidable in one direction on the shaft to a greater or less degree by and in accordance with the force of the wind, spring means for sliding the hub in the opposite direction under a relatively reduced wind force, a motion transmitting and translating means operable by the sliding movements of the hub to change the pitch or angle of incidence of the blades according to wind strength to cause the shaft to be normally driven at a substantially constant power and speed, a power device driven by the shaft, and a device coupled to said motion transmitting means and controlled in action by power demand on the power device to actuate said motion transmitting means to increase the power angle of the blades at the constant speed.

3. A wind driven turbine including in combination a rotatable non-sliding shaft, a hub rotatable with and slidable longitudinally of the shaft, blades carried by the hub and axially adjustable to vary their pitch or angle of incidence, the hub and blades being coupled to the shaft and rotatable by the action of the wind to drive the shaft, said hub and blades being slidable in one direction on the shaft by the wind to a greater or less degree in accordance with the strength of the wind force, means for resisting the sliding movement of the hub under wind forces of certain intensities and operating to slide the hub in the opposite direction under relatively reduced wind forces, motion transmitting and translating means operable by the sliding movements of the hub to change the pitch or angle of incidence of the blades according to the strength of the wind to cause the shaft to be normally driven at a substantially constant power and speed, a generator driven by the shaft for supplying current to a service circuit, and means controlled by circuit conditions influencing the generator to adjust said motion transmitting means to change the pitch angle of the blades to secure a higher driving power at any speed at which the shaft is being driven.

4. A wind driven turbine including in combination a rotatable non-sliding shaft, a hub rotatable with and slidable longitudinally on the shaft, blades carried by the hub and axially adjustable to vary their pitch or angle of incidence, the hub and blades being rotatable by the action of the wind and coupled to the shaft to drive said shaft, and said hub and blades being slidable by the wind on the hub in one direction under wind forces of increasing intensities, means providing a counteracting force energized by such sliding movement of the hub and blades for sliding the hub in the opposite direction under relatively reduced wind forces, motion transmitting and translating means operable by the sliding movement of the hub to change the pitch or angle of incidence of the blades according to wind strength to cause the shaft to be driven normally at a substantially constant speed, a generator driven by the shaft for supplying current to a service circuit, and a solenoid operated means controlled in action by generator torque according to circuit power demands for adjusting said motion transmitting means to adjust the blades to a higher power pitch than that at which it is adjusted at the time by the wind pressure and the counteracting force.

5. A wind driven turbine including in combination a variable propeller including a shaft and having blades adjustable to different pitch angles, wind controlled means including a sliding hub carrying the blades, means yieldingly resisting while permitting movement of the hub in one direction under increasing wind forces and moving it in the opposite direction under relatively reduced wind forces and a transmission coacting therewith and operable thereby for adjusting the blades when the hub is moved in opposite directions under varying wind forces to drive the shaft at a predetermined substantially constant speed and power regardless of the wind force, said means also including a longitudinally shiftable member for operating the transmission independent of the wind forces to adjust the blades, a power device driven by the shaft, and electrical means influenced thereby for operating said member to change the pitch angle of the blades to increase their driving power.

6. A wind driven turbine including in combination a variable propeller including a shaft and having blades adjustable to different pitch angles, wind controlled means including a sliding hub carrying the blades, means yieldingly resisting while permitting movement of the hub in one direction under increasing wind forces and moving it in the opposite direction under relatively reduced wind forces and a transmission coacting therewith and operable for adjusting the blades when the hub is moved in one direction or the other under varying wind forces to drive the shaft at a predetermined substantially constant speed and power regardless of the wind force, said means also including a longitudinally shiftable member for operating the transmission independent of the wind forces to adjust the blades, a power device driven by the shaft, and electrical means influenced thereby for operating said member to change the pitch angle of the blades to increase their driving power.

7. A wind driven turbine including a wind-driven driving member, a power transmitting member driven thereby, blades carried by the driving member and adjustable to vary their pitch or angle of incidence, wind-controlled governing means for adjusting the blades to a pitch angle calculated with relation to the strength of the wind to cause the driving member at various wind speeds to drive the driven member at a substantially constant speed, an alternator driven by the driven member and operating at full load at the driven speed of the driven member, said alternator having an ouput circuit, a service appliance, and a rheostat for cutting said appliance into and out of said circuit and operating in its cut-out position to form the circuit into a closed circuit through which the generator current may flow.

8. An electric generating system including in combination a propeller type wind motor having a blade adjustable to different pitch angles, wind-controlled means comprising a reciprocatory hub carrying the blade and adjusting means controlling the hub and controlled thereby for adjusting the blade under varying wind forces to a pitch angle to normally drive the motor at a predetermined substantially constant power and speed, a device movable in a path parallel with the path of reciprocation of the hub and operable independently of the hub to control the adjusting means to adjust the blade, a generator driven by the motor, and means controlled by an action of the generator for operating said device to adjust the blade to a pitch angle to drive the motor at a higher power at the constant speed.

9. An electric generating system including in combination a propeller type wind motor having a blade adjustable to different pitch angles, wind-controlled means comprising a reciprocatory hub carrying the blade and adjusting means controlling the hub and controlled thereby for adjusting the blade under varying wind forces to a pitch angle to normally drive the motor at a predetermined substantially constant power and speed, a device movable in a path parallel with the path of reciprocation of the hub and operable independently of the hub to control the adjusting means to adjust the blade, a generator driven by the motor, and means responsive to a current demand on the generator for operating said device to adjust the blade to a pitch angle to increase the driving power of the motor at the constant speed.

10. An electric generating system including in combination a propeller type wind motor having a blade adjustable to different pitch angles, wind-controlled means comprising a reciprocatory hub carrying the blade and adjusting means controlling the hub and controlled thereby for adjusting the blade under varying wind forces to a pitch angle to normally drive the motor at a predetermined substantially constant power and speed, a device movable in a path parallel with the path of reciprocation of the hub for controlling said adjusting means independently of the hub, a generator driven by the motor, and means comprising a solenoid in circuit with the motor and operating under generator torque to operate said device to change the normal action of the adjusting means to cause the same to adjust the blade to a pitch angle increasing the driving power of the motor at the constant speed.

11. An electric generating system including in combination a propeller type wind motor having a blade adjustable to different pitch angles, wind-controlled means including a longitudinally shiftable member and adjusting means actuated thereby and acting on the blade for adjusting the blade under varying wind forces to a pitch angle to normally drive the motor at a predetermined substantially constant power and speed, a second longitudinally shiftable member for actuating the adjusting means, a generator driven by the motor, and means comprising a solenoid winding in circuit with the generator and adapted to be energized by current from the generator and a solenoid core movable when the winding is energized to shift said second longitudinally movable member to change the pitch angle of the blade to increase the driving power of the motor.

12. In an electric generating system, a wind-driven motor, having a blade adjustable to different angles of incidence to drive the motor at different powers and speeds, wind-controlled governing means comprising a reciprocatory hub carrying the blade and adjusting means controlling the hub and controlled thereby for automatically adjusting the blade to normally drive the motor at a predetermined substantially constant power and speed, a device movable in a path parallel with the path of reciprocation of the hub for controlling the adjusting means to adjust the blade independently of the hub, an electric generator driven by the motor for supplying current for service operations, and means responsive to a current demand on the generator for operating said device to change the pitch angle of the blade to drive the motor at a higher power at the constant speed.

13. In an electric generating system, a wind-driven motor, having a shaft and a reciprocatory hub carrying a blade adjustable to different angles of incidence to drive the motor at different powers and speeds, wind-controlled governing means including the hub and adjusting means controlling the hub and controlled thereby for automatically adjusting the blade to normally drive the motor at a predetermined substantially constant power and speed, a device movable longitudinally of the shaft and controlling the adjusting means to adjust the blade independently of the hub, an electric generator driven by the shaft for supplying current for service operations, and a solenoid including a winding in circuit with the generator and a core coupled to said device to operate the same, said solenoid being responsive to generator torque for operating said device and the adjusting means to change the pitch angle of the blade to drive the motor at a higher power at the constant speed.

14. A wind-driven turbine including in combination a rotatable non-sliding shaft, a hub rotatable with and slidable longitudinally of the shaft, blades carried by the hub and axially adjustable to vary their pitch or angle of incidence, the hub and blades being rotatable by the action of the wind and coupled to the shaft to drive said shaft, said hub and blades being slidable in one direction on the shaft to a greater or less degree by and in accordance with the force of the wind, spring means for sliding the hub in the opposite direction under a relatively reduced wind force, a motion transmitting and translating means operable by the sliding movements of the hub to change the pitch or angle of incidence of the blades according to wind strength to normally cause the shaft to be driven at a substantially constant power and speed, a power device driven by the shaft, and electrical means influenced thereby and including an element and coupled to said motion transmitting means for actuating the same to arbitrarily vary the power angle of the blades and power transmitted to the power device at any working speed of the blades.

15. A wind driven turbine including in combination a rotatable non-sliding shaft, a hub rotatable with and slidable longitudinally of the shaft, blades carried by the hub and axially adjustable to vary their pitch or angle of incidence, the hub and blades being rotatable by the action of the wind and coupled to the shaft to drive said shaft, said hub and blades being slidable in one direction on the shaft to a greater or less degree by and in accordance with the force of the wind, spring means for sliding the hub in the opposite direction under a relatively reduced wind force, a motion transmitting and translating means operable by the sliding movements of the hub to change the pitch or angle of incidence of the blades according to wind strength to normally cause the shaft to be driven at a substantially constant power and speed, at generator driven by the shaft, a motion transmitting member slidably supported by the shaft and coupled to said motion transmitting means, and a solenoid comprising a winding in circuit with the generator so as to be energized thereby and a core arranged to shift said member when the winding is energized to cause the motion transmitting means to arbitrarily adjust the blades from a normal power pitch angle to which it has been adjusted by wind force to a higher power pitch angle.

16. A wind driven turbine including in combination a rotatable non-sliding shaft, a hub rotatable with and slidably longitudinally of the shaft, blades carried by the hub and axially adjustable to vary their pitch or angle of incidence, the hub and blades being rotatable by the action of the wind and coupled to the shaft to drive said shaft, said hub and blades being slidable in one direction on the shaft to a greater or less degree by and in accordance with the force of the wind, spring means for sliding the hub in the opposite direction under a relatively reduced wind force, a motion transmitting and translating means operable by the sliding movement of the hub to change the pitch or angle of incidence of the blades according to wind strength to normally cause the shaft to be driven at a substantially constant power and speed, a generator driven by the shaft, and a device coupled to said motion transmitting means and controlled in action by the generator to actuate said motion transmitting means to arbitrarily vary the power angle of the blades at the speed at which they are driven and the driving force transmitted to the generator.

17. A wind driven turbine including in combination a rotatable non-sliding shaft, a hub rotatable with and slidable longitudinally of the shaft, blades carried by the hub and axially adjustable to vary their pitch or angle of incidence, the hub and blades being rotatable by the action of the wind and coupled to the shaft to drive said shaft, said hub and blades being slidable in one direction on the shaft to a greater or less degree by and in accordance with the force of the wind, spring means for sliding the hub in the opposite direction under a relatively reduced wind force, a motion transmitting and translating means operable by the sliding movements of the hub to change the pitch or angle of incidence of the blades according to wind strength to normally cause the shaft to be driven at a substantially constant power and speed, a generator driven by the shaft, a device coupled to said motion transmitting means for actuating the same to arbitrarily vary the pitch angle of the blades at any speed of the blades to increase the power transmitted thereby to said generator and electromagnetic means influenced by the generator for operating said device.

CHARLES FUMAGALLI.

REFERENCES CITED

The following references are of record in the file of this patent:

UNITED STATES PATENTS

| Number    | Name          | Date          |
|-----------|---------------|---------------|
| 1,274,545 | Herwehe       | Aug. 6, 1918  |
| 1,312,021 | Dickenson et al. | Aug. 5, 1919 |
| 1,362,753 | Sperry        | Dec. 21, 1920 |
| 1,674,316 | Brzykcy       | June 19, 1928 |
| 1,720,402 | Rokita        | July 9, 1929  |
| 2,080,955 | Watkins       | May 18, 1937  |
| 2,106,557 | Putnam        | Jan. 25, 1938 |
| 2,148,804 | Claytor       | Feb. 28, 1939 |
| 2,179,962 | Scott         | Nov. 14, 1939 |
| 2,302,054 | Putt          | Nov. 17, 1942 |
| 2,347,104 | Hoover        | Apr. 18, 1944 |
| 2,360,791 | Putnam        | Oct. 17, 1944 |
| 2,360,792 | Putnam        | Oct. 17, 1944 |
| 2,363,850 | Bany          | Nov. 28, 1944 |
| 2,484,197 | Veldhuis      | Oct. 11, 1949 |

FOREIGN PATENTS

| Number  | Country  | Date          |
|---------|----------|---------------|
| 878,544 | France   | Oct. 19, 1942 |
| 887,484 | France   | Aug. 16, 1943 |
| 62,580  | Denmark  | July 31, 1944 |
| 63,270  | Denmark  | Feb. 26, 1945 |